July 9, 1968

H. G. H. BADEN 3,391,805

APPARATUS FOR ASSEMBLING GLASS SHEETS DURING MANUFACTURE
OF DOUBLE GLAZED WINDOWS

Filed May 26, 1964

INVENTOR
HANS G. H. BADEN.
BY
Fetherstonhaugh & Co.
ATTORNEYS

INVENTOR
HANS G. H. BADEN
BY
*Fetherstonhaugh & Co*
ATTORNEYS 3,391,805
APPARATUS FOR ASSEMBLING GLASS SHEETS
DURING MANUFACTURE OF DOUBLE GLAZED
WINDOWS
Hans G. H. Baden, St. Albert, Alberta, Canada, assignor to Sun Enterprises Ltd., Edmonton, Alberta, Canada, a corporation of Alberta
Filed May 26, 1964, Ser. No. 370,307
18 Claims. (Cl. 214—6)

ABSTRACT OF THE DISCLOSURE

Apparatus including suction means for gripping a sheet of glass over a face thereof, and means for shifting said gripped sheet into a position over another sheet of glass in parallel relationship to the latter.

---

This invention relates to apparatus for assembling glass sheets for double glazed windows during the manufacture thereof, and for assembling other sheets which it may be desired to place in parallel relationship.

This apparatus is particularly designed for assembling glass sheets for double glazed windows since it is rather difficult to assemble these sheets, particularly if they are relatively large, but the apparatus may be used for assembling other sheets or panels, and the term "glass sheets" is used herein for convenience, but it is to be understood that this includes any sheet material for any other purpose.

During the manufacture of some types of double glazed windows, two glass sheets are laid parallel to each other, usually with a spacer therebetween, after which a sealing compound is applied to the edges of the glass sheets to hold them together and to seal off the space therebetween. The handling of large glass sheets has always been a problem, and even when jigs and hand suction cups were used, there was always the risk of glass breakage and injury to the workers. The prior methods required highly skilled workers. Part of the difficulty was caused by the fact that the inner surface of the two glass sheets had to be thoroughly cleaned before they were put together. As a result of this, one sheet has to be turned over prior to being moved into the final position.

The apparatus according to the present invention includes a table and a carrying frame upon which two sheets of glass are respectively laid with the surfaces facing up that are to be the inner surfaces when the window is completed. These surfaces are thoroughly cleaned. Suction means on the frame is operable releasably to retain the sheet of glass on the latter. The apparatus includes means connected to the frame for shifting it between a first horizontal position away from the table, where the glass is first laid thereon, and a second position over the table. During the shifting from the first to the second position, the frame is turned over so that the cleaned surface of the glass held on said frame now faces the cleaned surface of the glass sheet on the table. At this time, the sheet on the table can be properly aligned with the other sheet. In the preferred form of the apparatus, means is provided for lifting the table to shift the sheet of glass thereon into its final position relative to the sheet being held over the table by the frame. With this arrangement, the sheet of glass held on the frame is turned over without anyone having to touch it, thereby eliminating danger of breakage and of harm to workers. This apparatus can do the job very quickly, thereby lowering the cost of manufacture of the double glazed window units, as a result of the saving of time and of the elimination of breakage during this part of the operation.

Figure 1:
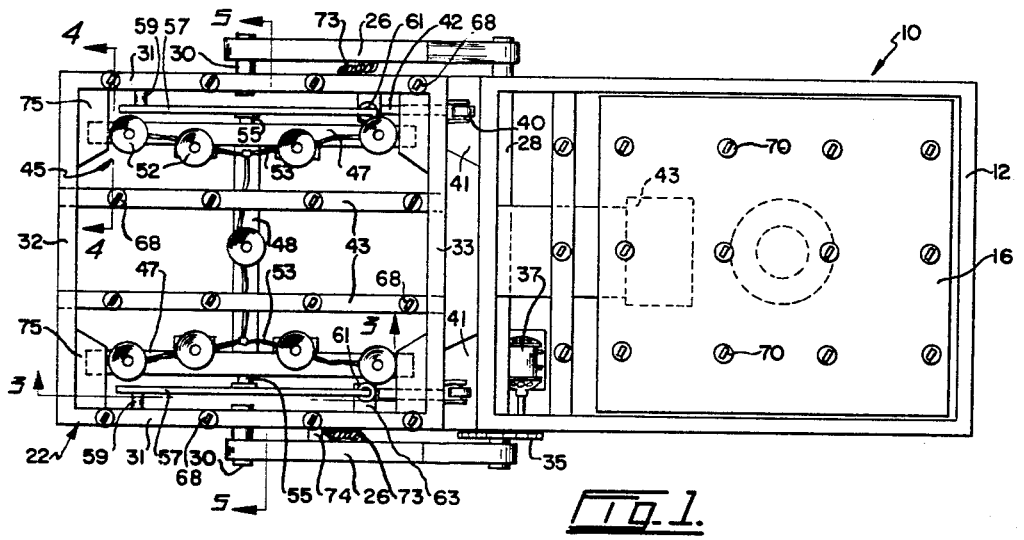
Figure 2:
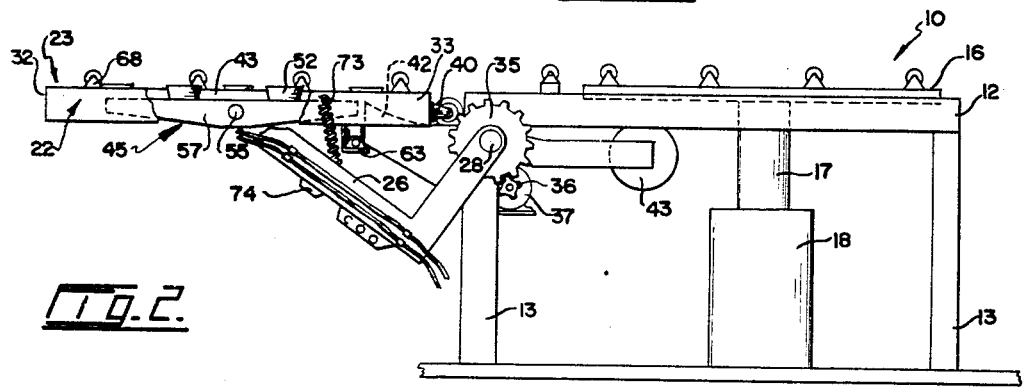
Figure 6:
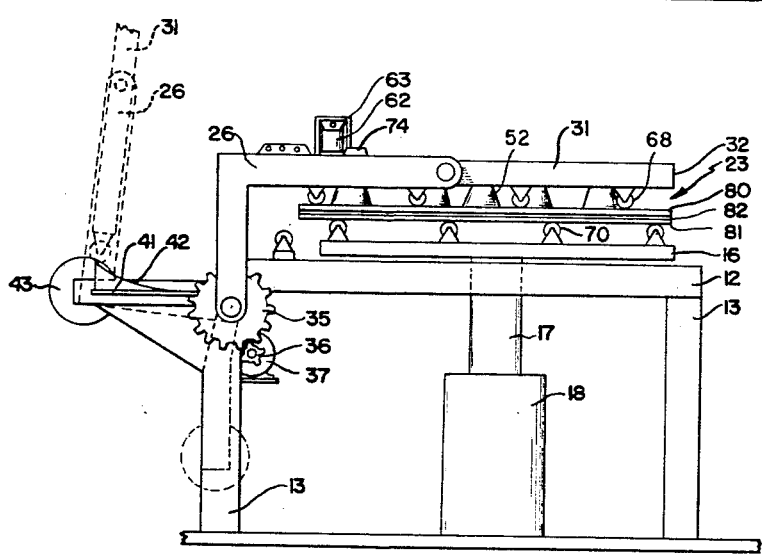
Figure 3:
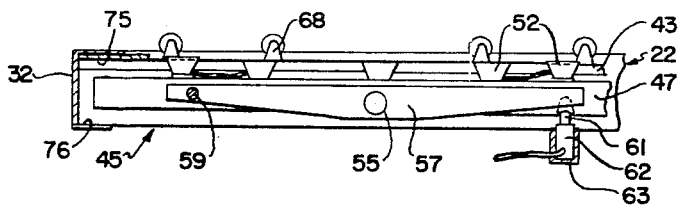
Figure 4:
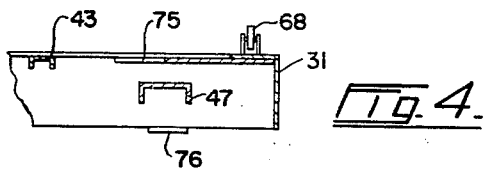
Figure 5:
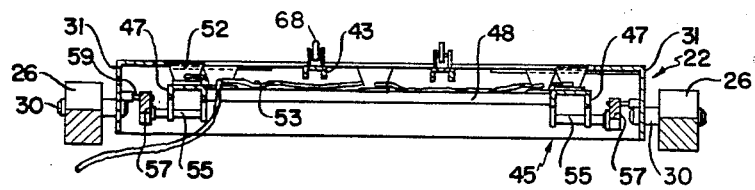
Figure 7:
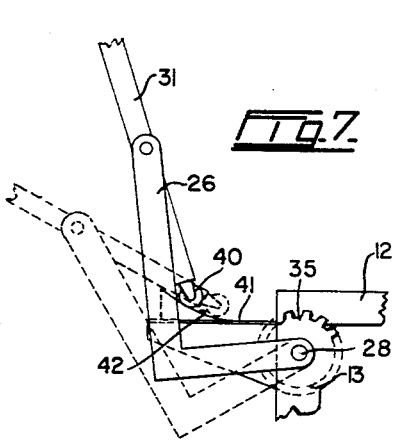
Figure 8:
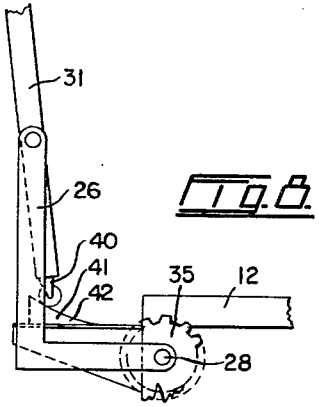

An example of this apparatus is illustrated in the accompanying drawings, in which, FIGURE 1 is a plan view of the apparatus in open position, with the carrying frame shifted away from the table, FIGURE 2 is a side elevation of the apparatus shown in FIGURE 1, FIGURE 3 is a sectional view taken on the line 3—3 of FIGURE 1, FIGURE 4 is a section taken on the line 4—4 of FIGURE 1, FIGURE 5 is a cross section taken on the line 5—5 of FIGURE 1, FIGURE 6 is a side elevation of the apparatus in the closed position, and FIGURES 7 and 8 are diagrams illustrating the action of the carrying frame during movement between its first and second positions.

Referring to the drawings, the assembling apparatus 10 comprises a base 12 which is in the form of a hollow rectangle, as shown in FIGURE 1, said base including a plurality of legs 13. A table 16 is mounted within base 10, and is preferably movable up and down by suitable mechanism. In this example, table 16 is mounted on the upper end of a ram 17 projecting from a hydraulic cylinder 18. As the controls for cylinder 18 are standard, they do not need any description herein. Apparatus 10 includes a carrying frame 22 having a working surface 23, said frame lying in a substantially horizontal plane when the apparatus is open, as shown in FIGURES 1 and 2, at which time working surface 23 faces upwardly. This frame is movable to a position over and spaced above table 16, at which time, working surface 23 faces downwardly as in FIGURE 6. In other words, when frame 22 is swung between its two positions in the apparatus, it is simultaneously turned over.

In the illustrated example of the invention, frame 22 is moved by a pair of arms 26, one on each side of the frame and extending therefrom and overlapping opposite sides of base 12. Each arm 26 is substantially L-shaped, and has one end fixedly mounted on a shaft 28 which is rotatably carried by base 12 near one end thereof. Trunnion pins 30 project outwardly from opposite sides 31 of frame 22 substantially midway between ends 32 and 33 of said frame, said pins being journalled in the opposite ends of arms 26, see FIGURE 1. Shaft 28 is rotated in opposite direction in any suitable manner, such as by means of a gear 35 fixedly mounted on the shaft near one end thereof and meshing with a pinion 36 which is rotated by the reversible electric motor 37 carried by base 12. A pair of rollers 40 project from frame end 33 towards the adjacent end of base 12 and rest on platforms 41 carried by the adjacent end of said base. Each platform 41 has an upwardly-inclined ramp 42 spaced outwardly from base 12 and in line with the roller 40 on said platform. If desired, a counterweight 43 is provided for frame 22, said counterweight being connected to shaft 28 and projecting inwardly of the apparatus away from said frame.

Carrying frame 22 preferably has a plurality of spaced supports 43 extending between ends 32 and 33 thereof and substantially parallel to its sides 31. A subframe 45 is mounted within and carried by frame 22. In this example, subframe 45 includes two spaced side members 47 extending substantially parallel to frame sides 31, and a cross member 48 which interconnects longitudinal members 47 substantially midway between the ends thereof, said cross member extending beneath supports 43 of the carrying frame. Members 47 of subframe 45 carry a plurality of suction cups 52 which project upwardly from said members between frame supports 43 and frame sides 31. An air hose 53 extends from each cup 52 to suitable suction equipment, not shown. Subframe 45 has trunnion pins 55 projecting laterally from members 47 thereof substantially midway between the ends of said members, said pins being journalled in supporting arms 57 between the ends thereof, these arms being positioned outside frame members 47 and extending substantially parallel therewith. One end of each supporting arm 57 is journalled on a pin 59 extending inwardly from a frame side 31 near end 32 of frame 22, while the opposite end of each arm 57 is connected to an end of a ram 61 of an air or hydraulic cylinder 62 which is carried by a bracket 63 mounted on an adjacent frame side 31. When rams 61 are in their normally retracted positions, arms 57 are so located that the outer rims of suction cups 52 are a little below the surfaces of frame sides 31 and supports 43 which are in a common plane. In other words, subframe 45 is depressed relative to carrying frame 22 at this time. When rams 61 are extended by their cylinders 62, the ends of arms 57 connected to these rams, are lifted relative to carrying frame 22 to raise cups 52 relative to the working surface of said carrying frame. Subframe 45 remains substantially parallel with carrying frame 22 at this time owing to its connection to arms 57 through trunnion pins 55.

It is preferable to provide a plurality of rotatable bearings 68 at the working surface 23 of carrying frame 22. In this example, the bearings are in the form of casters rotatably mounted on frame sides 31 and longitudinal supports 43. Actually, the outer or bearing surfaces of these casters constitute the effective working surface of frame 22. Table 10 has a plurality of rotatable bearings 70 mounted on and projecting upwardly from the upper surface thereof, said bearings preferably being in the form of casters.

A spring 73 extending between each arm 26 and the adjacent side of frame 22 near the inner end 33 thereof helps to maintain said frame 22 in a substantially horizontal plane when the apparatus is open by drawing rollers 40 against platforms 41, as shown in FIGURE 2. At this time, arms 26 are angularly disposed relative to frame 22, but as the apparatus is being closed, these springs draw frame 22 against stops 74 on arms 26 to retain said frame substantially parallel with the sections of arms 26 carrying trunnion pins 55, said arm sections being in a substantially horizontal plane when the apparatus reaches the closed position, as shown in FIGURE 6. At least one end of each sub frame member 47 projects between a pair of spaced plates 75 and 76 carried by frame 22 see FIGURE 4 said plates being spaced apart sufficiently to allow the member 47 to be moved up and down relative to frame 22 and yet preventing said member from swinging too far out of its normal plane on trunnions 55.

When apparatus 10 is in operation, a sheet of glass is placed on bearings 70 of table 16, and another sheet is placed on bearings 68 of carrying frame 22 when the latter is in its open position, as shown in FIGURES 1 and 2. When the rams 61 of cylinders 62 are extended, supporting arms 57 swing upwardly to shift sub frame 45 upwardly and thereby bring suction cups 52 into contact with the sheet of glass on bearings 68. Then suction is applied to cups 52 through hoses 53 firmly to draw the sheet of glass against bearings 68. Motor 37 is operated to rotate shaft 28 to cause arms 26 to swing carrying frame 22 and its associated elements over table 16. The carrying frame is turned over at this time so that what was the upper surface of the sheet of glass on bearings 68 is now the lower surface facing the sheet resting on bearings 70 of table 16. FIGURE 6 illustrates a sheet of glass 80 held against the carrying frame bearings lying over another sheet of glass 81 resting on the table bearings. Usually a hollow frame 82 rests on the upper surface of sheet 81, said frame forming part of a double glazed window assembly. Lower sheet 81 may now be shifted up on bearings 70 until it registers exactly with upper sheet 80, and then cylinder 18 is operated to raise table 16 and thereby press sheet 81 against frame 82 and the latter against upper sheet 80. While these elements are held in this position, sealing compound is applied to the edges of the glass sheet and the spacer therebetween. When the window unit is completed, suction is cut off from cups 52 to release sheet 80, and ram 17 is retracted. Then carrying frame 22 is swung back to its first position by arms 26, and subframe 45 is depressed relative to the carrying frame, so that suction cups 52 will not interfere with the next sheet of glass being placed on and moved over bearings 68.

FIGURES 2 and 6 show carrying frame 22 in its first and second horizontal positions, while FIGURES 7 and 8 diagrammatically illustrate said frame in two intermediate positions. As arms 26 start to move frame 22 out of its first horizontal position, as in FIGURE 2, springs 73 continue to draw rollers 40 against platforms 41. During further movement of the arms, these rollers ride up ramps 42, and when said rollers near the tops of the ramps, frame 22 is engaged by stops 74, against which they are held by springs 73. Frame 22 and arms 26 now in effect become a single unit and remain so as the frame reaches and leaves its second horizontal position, as in FIGURE 6, and until the rollers again engage the ramps on the return journey of the arms. The rollers now ride back down the ramps on to platforms 41. Thus, springs 73 at all times keep frame 22 with its rollers 40 against platforms 41 or ramps 42, or against stops 74 of arms 26, ensuring smooth movement of the frame and preventing undue vibration thereof. Furthermore, the downward pull of the springs on the supporting frame during the first part of the movement of the frame out of its first horizontal position, assists the movement of arms 26 at a time when they are subjected to the greatest strain or load.

What I claim as my invention is:

1. Apparatus for assembling double glazed windows, comprising a table upon which a first sheet of glass can be laid, a carrying frame having a working surface, means connected to the frame for shifting said frame between a first substantially horizontal position away from the table with its working surface facing up and a second position over the table with said working surface facing down, a normally depressed sub frame mounted on the carrying frame and movable relative to the working surface thereof, a plurality of suction cups mounted on said sub frame, means mounted on the frame and connected to the sub frame operable to move the latter to shift the suction cups thereof against a second sheet of glass placed on said working surface, and means for applying suction to the cups releasably to grip the second glass sheet to retain said sheet against the working surface, said carrying frame on being shifted to the position over the table transferring said second glass sheet to a position over the first glass sheet on the table.

2. Apparatus for assembling double glazed windows, comprising a table upon which a first sheet of glass can be laid, a tiltable carrying frame having a working surface, means swingably connected to the frame for shifting said frame between a first position away from the table and a second position over the table, resilient means connected to the carrying frame for adjustably retaining said frame in a substantially horizontal plane when in said first and second positions with its working surface respectively facing up and down, a normally depressed sub frame mounted on the carrying frame and movable relative to the working surface thereof, a plurality of suction cups mounted on said sub frame, means mounted on the frame and connected to the sub frame operable to move the latter to shift the suction cups thereof against a second sheet of glass placed on said working surface, and means for applying suction to the cups releasably to grip the second glass sheet to retain said sheet against the working surface, said carrying frame on being shifted to the position over the table transferring said second glass sheet to a position over the first glass sheet on the table.

3. Assembling apparatus as claimed in claim 1 including a plurality of rotatable bearings on the table upon which said first glass sheet rests.

4. Assembling apparatus as claimed in claim 1 including a plurality of rotatable bearings on the table upon which said first glass sheet rests, and a plurality of rotatable bearings on the carrying frame working surface upon which said second glass sheet rests.

5. Assembling apparatus as claimed in claim 1 including elevating means connected to the table operable to raise the latter when the carrying frame is in said second position.

6. Assembling apparatus as claimed in claim 1 including a counterweight connected to the carrying frame to assist the movement thereof between the first and second positions.

7. Apparatus for assembling double glazed windows, comprising a table upon which a first sheet of glass can be laid, a carrying frame having a working surface, a pair of arms each hingedly mounted at one end on the table and swingably connected at an opposite end to the frame, said arms being shaped to support the carrying frame in a first position away from the table and to swing said frame to a second position over the table, means co-acting between the frame and at least one arm for resiliently retaining the frame in a substantially horizontal position with its working surface up in said first position and in a position with said working surface facing down in said second position, power means connected to at least one of said arms to move it to shift the carrying frame between said first and second positions, and suction means on the frame operable releasably to retain a second sheet of glass against the working surface thereof, said frame on being shifted to the position over the table transferring said second glass sheet to a position over the first glass sheet on the table.

8. Apparatus for assembling double glazed windows, comprising a table upon which a first sheet of glass can be laid, a carrying frame having a working surface, a pair of arms each hingedly mounted at one end on the table and swingably connected at an opposite end to the frame, said arms being shaped to support the carrying frame in a first position away from the table and to swing said frame to a second position over the table, means co-acting between the frame and at least one arm for resiliently retaining the frame in a substantially horizontal position with its working surface up in said first position and in a position with said working surface facing down in said second position, power means connected to at least one of said arms to move it to shift the carrying frame between said first and second positions, a normally depressed sub frame mounted on the carrying frame and movable relative to the working surface thereof, a plurality of suction cups mounted on said sub frame, means mounted on the frame and connected to the sub frame operable to move the latter to shift the suction cups thereof against a second sheet of glass placed on said working surface, and means for applying suction to the cups releasably to grip the second glass sheet to retain said sheet against the working surface, said carrying frame on being shifted to the position over the table transferring said second glass sheet to a position over the first glass sheet on the table.

9. Assembling apparatus as claimed in claim 8 in which the sub frame is tiltably mounted on the carrying frame.

10. Assembling apparatus as claimed in claim 8 including a plurality of rotatable bearings on the table upon which said first glass sheet rests.

11. Assembling apparatus as claimed in claim 8 including a plurality of rotatable bearings on the table upon which said first glass sheet rests, and a plurality of rotatable bearings on the carrying frame constituting the working surface thereof and upon which said second glass sheet rests.

12. Assembling apparatus as claimed in claim 8 including elevating means connected to the table operable to raise the latter when the carrying frame is in said second position.

13. Apparatus for assembling double glazed windows, comprising a table upon which a first sheet of glass can be laid, a carrying frame having a working surface, a pair of arms each hingedly mounted at one end on the table and swingably connected at an opposite end to a side of the frame between ends of the latter, said arms being shaped to support the carrying frame in a first substantially horizontal position extending away from the table with one end near said table and with its working surface facing up and to swing said frame to a second position over the table with said working surface facing down, stationary supporting means upon which said one end of the frame rests when the frame is in the first horizontal position, resilient means connecting the frame to one of said arms tending to swing said one end of the frame towards the arm and resiliently retaining said one frame end against the supporting means to keep the frame in the first horizontal position, stop means co-acting between at least one arm and the frame and against which the resilient means draws said one frame end when the arms swing the frame away from said supporting means to the second horizontal position, power means connected to at least one of said arms to move it to shift the carrying frame between said first and second positions, a normally depressed subframe mounted on the carrying frame and movable relative to the working surface thereof, a plurality of suction cups mounted on said sub frame, means mounted on the frame and connected to the sub frame operable to move the latter to shift the suction cups thereof against a second sheet of glass placed on said working surface, and means for applying suction to the cups releasably to grip the second glass sheet to retain said sheet against the working surface, said carrying frame on being shifted to the position over the table transferring said second glass sheet to a position over the first glass sheet on the table.

14. Apparatus for assembling double glazed windows, comprising a base, a table forming a part of the base and upon which a first sheet of glass can be laid, a carrying frame having a working surface, a pair of substantially L-shaped arms each hingedly mounted at one end on the base and swingably connected at an opposite end to a side of the frame between ends of the latter, said arms being adapted to support the carrying frame in a first substantially horizontal position extending away from the table with one end near said table and with its working surface facing up and to swing said frame to a second position over the table with said working surface facing down, stationary supporting means upon which said one end of the frame rests when the frame is in the first horizontal position, resilient means connecting the frame to one of said arms tending to swing said one end of the frame towards the arm and resiliently retaining said one frame end against the supporting means to keep the frame in the first horizontal position, stop means co-acting between at least one arm and the frame and against which the resilient means draws said one frame end when the arms swing the frame away from said supporting means to the second horizontal position, power means connected to at least one of said arms to move it to shift the carrying frame between said first and second positions, a normally depressed subframe mounted on the carrying frame and movable relative to the working surface thereof, a plurality of suction cups mounted on said sub frame, means mounted on the frame and connected to the sub frame operable to move the latter to shift the suction cups thereof against a second sheet of glass placed on said working surface, and means for applying suction to the cups releasably to grip the second glass sheet to retain said sheet against the working surface, said carrying frame on being shifted to the position over the table transferring said second glass sheet to a position over the first glass sheet on the table.

15. Assembling apparatus as claimed in claim 13 including bearing means on said one end of the frame retained against said supporting means when the frame is in its first position, and ramp means on the supporting means against which said bearing means is forced by said resilient means during the first part of the movement of the frame from its first position towards the second position thereof.

16. Assembling apparatus as claimed in claim 14 including bearing means on said one end of the frame retained against said supporting means when the frame is in its first position, ramp means on the supporting means against which said bearing means is forced by said resilient means during the first part of the movement of the frame from its first position towards the second position thereof, and a counterweight connected to the carrying frame to assist the movement thereof between the first and second positions.

17. Assembling apparatus as claimed in claim 13 including a plurality of rotatable bearings on the table upon which said first glass sheet rests, and a plurality of rotatable bearings on the carrying frame constituting the working surface thereof and upon which said second glass sheet rests.

18. Assembling apparatus as claimed in claim 14 including elevating means connected to the table operable to raise the latter when the carrying frame is in said second position.

References Cited
UNITED STATES PATENTS

| | | | |
|---|---|---|---|
| 1,801,309 | 4/1931 | Gipe | 214—1 |
| 2,022,242 | 11/1935 | Kristof | 214—1 |
| 2,138,164 | 11/1938 | Haven | 156—109 |
| 2,838,810 | 6/1958 | Englehart et al. | 52—172 |

ROBERT F. BURNETT, *Primary Examiner.*

EARL M. BERGERT, *Examiner.*

W. J. VAN BALEN, *Assistant Examiner.*